G. F. ZUCKER.
VEHICLE SPRING SUSPENSION.
APPLICATION FILED MAR. 17, 1919.
1,327,076.
Patented Jan. 6, 1920.
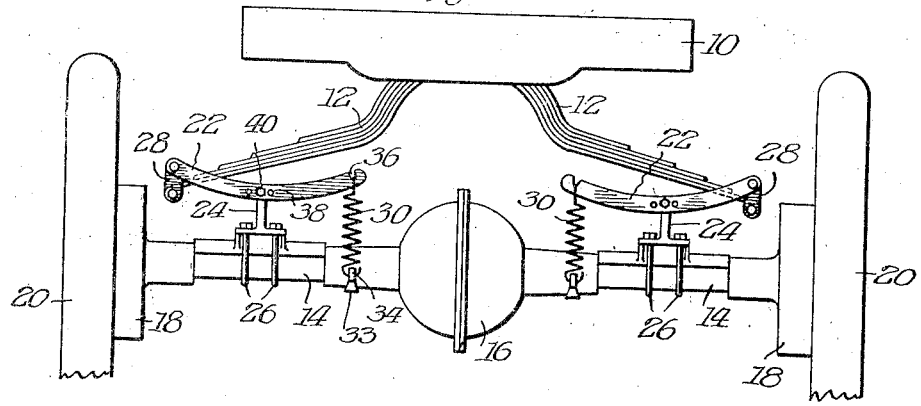
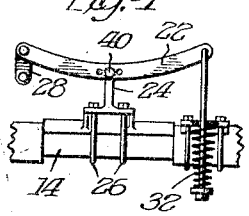
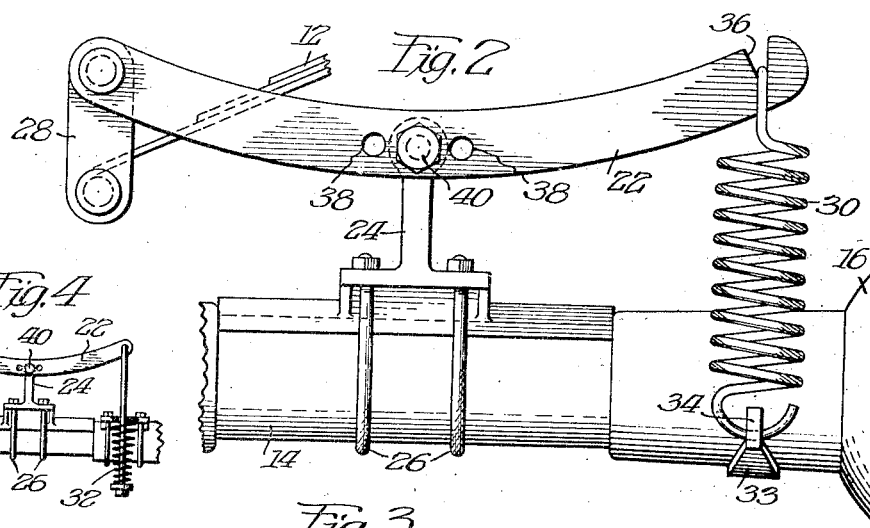
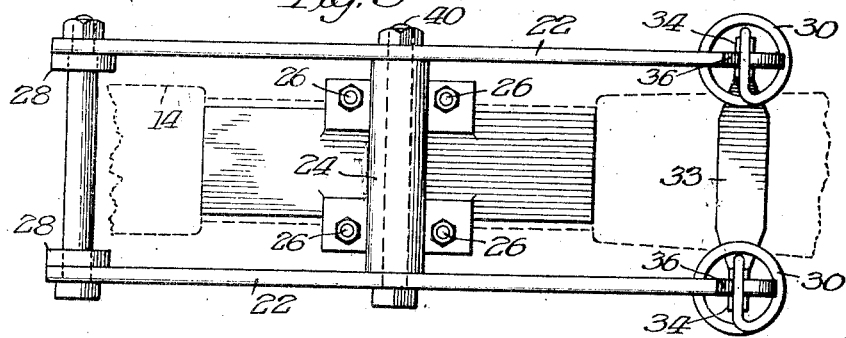
Inventor
Gottlieb F. Zucker
By Cheever & Cox
Attys

UNITED STATES PATENT OFFICE.

GOTTLIEB F. ZUCKER, OF CHICAGO, ILLINOIS.

VEHICLE-SPRING SUSPENSION.

1,327,076.

Specification of Letters Patent.

Patented Jan. 6, 1920.

Application filed March 17, 1919. Serial No. 283,195.

*To all whom it may concern:*

Be it known that I, GOTTLIEB F. ZUCKER, a citizen of the United States, residing at Chicago, in the county of Cook and State of Illinois, have invented a certain new and useful Improvement in Vehicle-Spring Suspensions, of which the following is a specification.

This invention relates to the spring suspension of heavy vehicles, such as automobile trucks.

The object of the invention is to provide spring mechanism supplemental for the vehicle body, frame, or ordinary spring devices of a vehicle which greatly improve the riding qualities of the vehicle, and consequently reduce the jars to the load carried.

The invention consists in mechanism capable of carrying out the foregoing objects, which can be easily and cheaply made, which is satisfactory in operation, and is not liable to readily get out of order. It also consists in the many features and details of construction which will be hereafter more fully set forth in the specification and claims.

Referring to the drawings, in which like letters of reference represent the same parts throughout the several views, Figure 1 is an end view of a truck or other vehicle having the mechanism of this invention applied thereto.

Fig. 2 is an enlarged side view of the mechanism of this invention, partially disconnected from the vehicle.

Fig. 3 is a plan view of the parts shown in Fig. 1.

Fig. 4 is an alternative construction showing the use of a compression spring in place of the retractile spring mechanism of Figs. 1, 2 and 3.

The invention may be applied to a great variety of vehicles—the particular one shown for the purpose of illustrating the invention is a truck having a body 10 supported at the midpoint of its end by a semi-elliptic spring 12 having its ends connected to the brake drum housings 18. An axle 14 carries at its ends wheels 20 and at its midpoint the usual universal housing 16.

In these parts just described, common to the art, it is obvious that the possible length of each arm of the leaf spring 12 from the vehicle body 10 is limited by the distance between the wheels 20, and it is well understood that if the flexible portion of the spring is short it will be stiff and therefore produce a hard riding vehicle. One of the objects of this invention is to take such an ordinary spring which is as long and consequently as flexible as it can be made, and by connecting a supplemental mechanism between it and the axle, render the vehicle more easy riding. A further object is to do this easily and economically by mounting the supplemental spring mechanism in or parallel to the axle. This is accomplished in the preferred form of mechanism shown by mounting on the axle 14 below the adjacent spring 12 a normally horizontal lever device 22, carried by a suitable support 24 attached to the axle 14 by any suitable means, as for instance the U-shaped bends 26, and to connect one end of this lever mechanism 22 with the adjacent spring 12, while the other end is attached to and controlled by a supplemental spring which helps out the main spring 12. In the particular case here illustrated, this lever mechanism 22 is parallel to the vehicle axle and is attached to the end of the adjacent leaf spring 12 by a link 28, and the spring mechanism controlling the other end of the lever is a retractile spring or springs 30 of Figs. 1, 2 and 3, or a compression spring mechanism 32 of Fig. 4. In each case the spring is connected to the axle at a point somewhere near the center of the axle, thus minimizing the vertical movement of a single wheel transmitted to the springs.

In the particular form of device shown in Figs. 1, 2 and 3, the spring mechanism 30 is made of two separate springs located on opposite sides of the axle or shaft, connected together below the shaft by a cross-member 33, detachably engaged by the springs in the hook mechanism 34. Similarly, the upper ends of the springs 30 are detachably connected to adjacent portions of the lever 22, entering notches 36. The result of this construction is that by properly depressing the end of lever 22 adjacent to springs 30, the springs may be released from the lever and from the shaft for repair or replacing.

The lever mechanism 22 is, as heretofore stated, pivoted on the support 24. Adjustment of the lever with reference to the support is effected by virtue of the fact that a plurality of holes 38 for the pivot bolt 40 are provided along the length of the lever mechanism 22, from which it is obvious that by selectively positioning the lever at different pivotal points along its length, the power of the adjacent spring 30 acting on the ends of leaf spring 12 may be varied within proper limits at the will of the operator.

In the operation of the device, assume that a vehicle containing the parts 10, 12, 14, 16, 18 and 20 is unsatisfactory in its spring action and it is desired to improve the same. The operator merely separates the spring device 12 from the original normal connection (not shown) with the axle 12; then places upon the axle the two supporting devices 24 with their respective levers 22; connects the outer ends of the levers by the links 28 to the leaf springs 12, and connects the inner ends of the levers 22 to the axle 14 by the spring mechanisms 30 or 32, as the case may be. If the device is not now quite satisfactory, he adjusts the spring tension by varying the pivotal points of the levers 22 along their length.

It is to be noted that by placing the springs 30 and 32 at the sides of the axle 14 sufficient spring expansion space is provided so that the levers 22 can be placed on low supports 24 instead of away up on high ones as in prior constructions. This makes a lower vehicle throughout possible than would otherwise be possible.

Having thus described my invention what I claim as new and desire to secure by Letters Patent, is:—

1. In a device of the class described, the combination of a vehicle axle and its wheel, a vehicle body and its leaf spring, a lever mechanism lying approximately parallel to the axle, pivoted intermediate between its ends to a support on the axle, a connection between the portion of said lever nearest the adjacent wheel and the leaf spring of said vehicle, and a spring connection between said lever mechanism and the axle, said spring connection carrying the pressure of the vehicle load only, and being applied between the axle and the end portion of the lever which is nearest the vehicle center.

2. In a device of the class described, the combination of a vehicle axle and its wheel, a vehicle body and its leaf spring, a lever mechanism lying approximately parallel to the axle, pivoted intermediate between its ends to a support on the axle, a connection between the portion of said lever nearest the adjacent wheel and the leaf spring of said vehicle, and a retractile spring connection between said lever mechanism and the axle, said retractile spring connection carrying only the pressure of the vehicle load and being applied between the axle and the end portion of the lever which is nearest the vehicle center.

3. As an article of manufacture, a lever support 24, a lever 22, pivotally mounted thereon, a pair of springs 30 at opposite sides of one end of the lever 22, a detachable bar member 33 adapted to pass beneath the ends of said axle and be connected to the ends of said springs 30, and means for connecting the opposite end of said lever to movable parts of the vehicle body, all of the parts being arranged and disposed as shown and described, for the purposes set forth.

In witness whereof I have hereunto subscribed my name in the presence of two witnesses.

GOTTLIEB F. ZUCKER.

Witnesses:
 DWIGHT B. CHEEVER,
 M. S. ROSENZWEIG.